US009916243B2

(12) United States Patent
Walker et al.

(10) Patent No.: US 9,916,243 B2
(45) Date of Patent: Mar. 13, 2018

(54) METHOD AND APPARATUS FOR PERFORMING A BUS LOCK AND TRANSLATION LOOKASIDE BUFFER INVALIDATION

(71) Applicant: Advanced Micro Devices, Inc., Sunnyvale, CA (US)

(72) Inventors: William L. Walker, Fort Collins, CO (US); Paul J. Moyer, Fort Collins, CO (US); Richard M. Born, Fort Collins, CO (US); Eric Morton, Austin, TX (US); David Christie, Austin, TX (US); Marius Evers, Sunnyvale, CA (US); Scott T. Bingham, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 498 days.

(21) Appl. No.: 14/522,137

(22) Filed: Oct. 23, 2014

(65) Prior Publication Data
US 2015/0120976 A1 Apr. 30, 2015

Related U.S. Application Data

(60) Provisional application No. 61/895,569, filed on Oct. 25, 2013.

(51) Int. Cl.
*G06F 12/08* (2016.01)
*G06F 9/46* (2006.01)
(Continued)

(52) U.S. Cl.
CPC .......... *G06F 12/0808* (2013.01); *G06F 9/467* (2013.01); *G06F 9/526* (2013.01);
(Continued)

(58) Field of Classification Search
None
See application file for complete search history.

(56) References Cited

U.S. PATENT DOCUMENTS 6,484,185 B1 11/2002 Jain et al.
7,761,696 B1 * 7/2010 Bhattacharyya .... G06F 13/4027
712/229

(Continued)

FOREIGN PATENT DOCUMENTS

WO 2013028414 A2 2/2013

*Primary Examiner* — Scott Sun
(74) *Attorney, Agent, or Firm* — Volpe and Koenig, P.C.

(57) ABSTRACT

A method and apparatus for performing a bus lock and a translation lookaside buffer invalidate transaction includes receiving, by a lock master, a lock request from a first processor in a system. The lock master sends a quiesce request to all processors in the system, and upon receipt of the quiesce request from the lock master, all processors cease issuing any new transactions and issue a quiesce granted transaction. Upon receipt of the quiesce granted transactions from all processors, the lock master issues a lock granted message that includes an identifier of the first processor. The first processor performs an atomic transaction sequence and sends a first lock release message to the lock master upon completion of the atomic transaction sequence. The lock master sends a second lock release message to all processors upon receiving the first lock release message from the first processor.

18 Claims, 4 Drawing Sheets

(51) Int. Cl.
*G06F 12/0808* (2016.01)
*G06F 12/1045* (2016.01)
*G06F 12/1027* (2016.01)
*G06F 9/52* (2006.01)
G06F 13/38 (2006.01)
G06F 12/10 (2016.01)

(52) U.S. Cl.
CPC ...... *G06F 12/1027* (2013.01); *G06F 12/1054* (2013.01); *G06F 2209/522* (2013.01); *G06F 2212/621* (2013.01); *G06F 2212/682* (2013.01); *G06F 2212/683* (2013.01)

(56) References Cited

U.S. PATENT DOCUMENTS

| | | |
|---|---|---|
| 2002/0038398 A1 | 3/2002 | Morrison et al. |
| 2002/0186711 A1* | 12/2002 | Masuyama ......... H04L 43/0817 370/468 |
| 2007/0033311 A1* | 2/2007 | Young ..................... G06F 21/57 710/107 |
| 2011/0191542 A1 | 8/2011 | Vash |
| 2011/0252168 A1 | 10/2011 | Saripalli |
| 2013/0054915 A1 | 2/2013 | Chee |

\* cited by examiner

METHOD AND APPARATUS FOR PERFORMING A BUS LOCK AND TRANSLATION LOOKASIDE BUFFER INVALIDATION

CROSS REFERENCE TO RELATED APPLICATIONS

This application claims the benefit of U.S. Provisional Patent Application No. 61/895,569 filed Oct. 25, 2013, the contents of which are hereby incorporated by reference herein.

FIELD OF THE INVENTION

The present invention is generally directed to bus lock operation and translation lookaside buffer invalidation operation.

BACKGROUND

Multiprocessor systems use atomic read-modify-write operations to process shared data structures amongst multiple processors or threads. These may operate on cacheable memory, as well as on noncacheable memory. When the operation is to cacheable memory and does not cross a boundary, (e.g., a cache line), the processor may utilize internal means such as cache line locking to keep the operation atomic. When the bus lock is to non-cacheable memory, or crosses a boundary where the processor cannot use an internal means, it requires a way to perform an atomic read-modify-write.

A common solution to provide the necessary atomicity for noncacheable atomic transactions is to "lock" the interconnect fabric, (i.e., the wiring and the signaling protocols by which processors, caches, and memory communicate with each other), reserving sole use of it to the one processor and stalling all others. Conventionally, this has been done in the fabric by arbitrating for, and enforcing, the lock condition at each switch point in the topology of the fabric.

Additionally, processors use virtual-to-physical address translation schemes and commonly cache these operations in Translation Lookaside Buffers (TLBs). When software changes one of these translations, such as to invalidate a virtual address, change protections on a page, move a page and the like, all cached (TLB) copies of the translations have to be removed before the software can take the changed translation into effect.

One conventional solution used to synchronize changes to translations is to let software explicitly invalidate TLBs on multiple processors by interrupting all processors and running a task on each one to invalidate the TLB entry, or entries, that changed. The processor initiating the translation change interrupts every other processor. The receiving processors run an interrupt handler that flushes the changing translation from their TLBs. Another conventional method used to synchronize changes to translations is direct hardware communication from processor to processor, (e.g., the software uses explicit TLB invalidate instructions to send hardware messages to every other processor describing the translation that is changing). After one or more initiating processors sends a "synchronize" message to every other processor and receives a handshake response back when all prior TLB-invalidate messages have had their full effect at that processor. Dedicated hardware ensures that the synchronize operation will not finish until every processor has stopped using every translation that was invalidated before the synchronization operation began.

In the conventional bus lock solution, every intermediate switch point in the interconnect fabric must be aware of the lock and implement hardware for it. Each switch point arbitrates between competing lock requestors and each switch point enforces a granted lock by interdicting traffic from non-locked processors. Accordingly, larger systems require more complex interconnect topologies.

The conventional synchronization solution for TLB invalidation requires point to point communication. This solution may not scale up well because it requires wiring or transactions proportional to the square of the number of processors involved. Additionally, it may result in lower performance through serialization of invalidate/sync sequences issued by multiple processors at the same time.

It would therefore be beneficial to provide a method and apparatus for performing a bus lock and/or a TLB invalidation that is not subject to the limitations of the conventional solutions.

SUMMARY OF EMBODIMENTS

An embodiment directed to a method for performing a bus lock is disclosed. The method includes receiving, by a lock master, a lock request from a first processor in a system. The lock master sends a quiesce request to all processors in the system, and upon receipt of the quiesce request from the lock master, all processors cease issuing any new transactions and issue a quiesce granted transaction. Upon receipt of the quiesce granted transactions from all processors, the lock master issues a lock granted message that includes an identifier of the first processor. The first processor performs an atomic transaction sequence and sends a first lock release message to the lock master upon completion of the atomic transaction sequence. The lock master sends a second lock release message to all processors upon receiving the first lock release message from the first processor.

An embodiment directed to a system for performing a bus lock is disclosed. The system includes a plurality of processors and a lock master. The lock master is configured to receive a lock request from a first processor of the plurality of processors in the system and send a quiesce request to all processors in the system. Upon receipt of a quiesce granted transaction from all processors, the lock master issues a lock granted message that includes an identifier of the first processor. The lock master sends a second lock release message to all processors upon receiving a first lock release message from the first processor.

An embodiment directed to an apparatus for performing a bus lock is disclosed. The apparatus includes circuitry configured to receive a lock request from a first processor of a plurality of processors in a system and send a quiesce request to all processors in the system. Upon receipt of a quiesce granted transaction from all processors, the apparatus issues a lock granted message that includes an identifier of the first processor. The apparatus sends a second lock release message to all processors upon receiving a first lock release message from the first processor.

BRIEF DESCRIPTION OF THE DRAWINGS

A more detailed understanding may be had from the following description, given by way of example in conjunction with the accompanying drawings wherein.

DETAILED DESCRIPTION OF THE EMBODIMENTS

Although a more detailed description of the embodiments is provided below, briefly a central lock master acts as an arbiter to receive requests to lock the bus from a processor when the processor has need to commence an atomic read-modify-write procedure. The lock master controls the bus to ensure that no other processors utilize the bus for any other operation. In another embodiment, a central synch master receives translation lookaside buffer (TLB) invalidate requests from a processor and broadcasts a synch message to all processors in the system.

Figure 1:
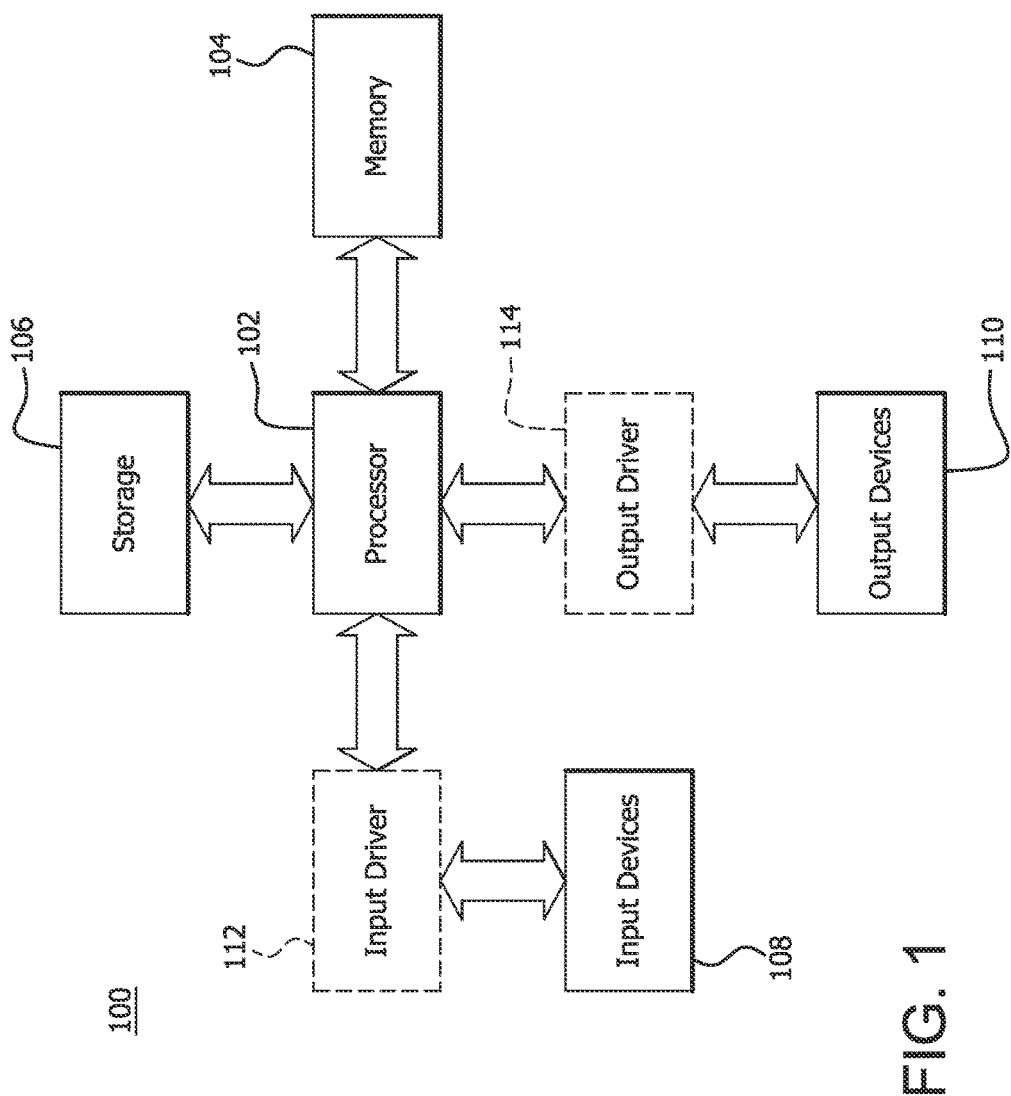
FIG. 1 is a block diagram of an example device in which one or more disclosed embodiments may be implemented.

FIG. 1 is a block diagram of an example device 100 in which one or more disclosed embodiments may be implemented. The device 100 may include a computer, for example, a desktop computer, a tablet computer, a gaming device, a handheld device, a set-top box, a television, or a mobile phone. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. Although described embodiments include a main display, the invention may be practiced without a main display, and only include a source device of video. In this way, the control territory may be an office environment with a plurality of portable devices and no main display.

Figure 2:
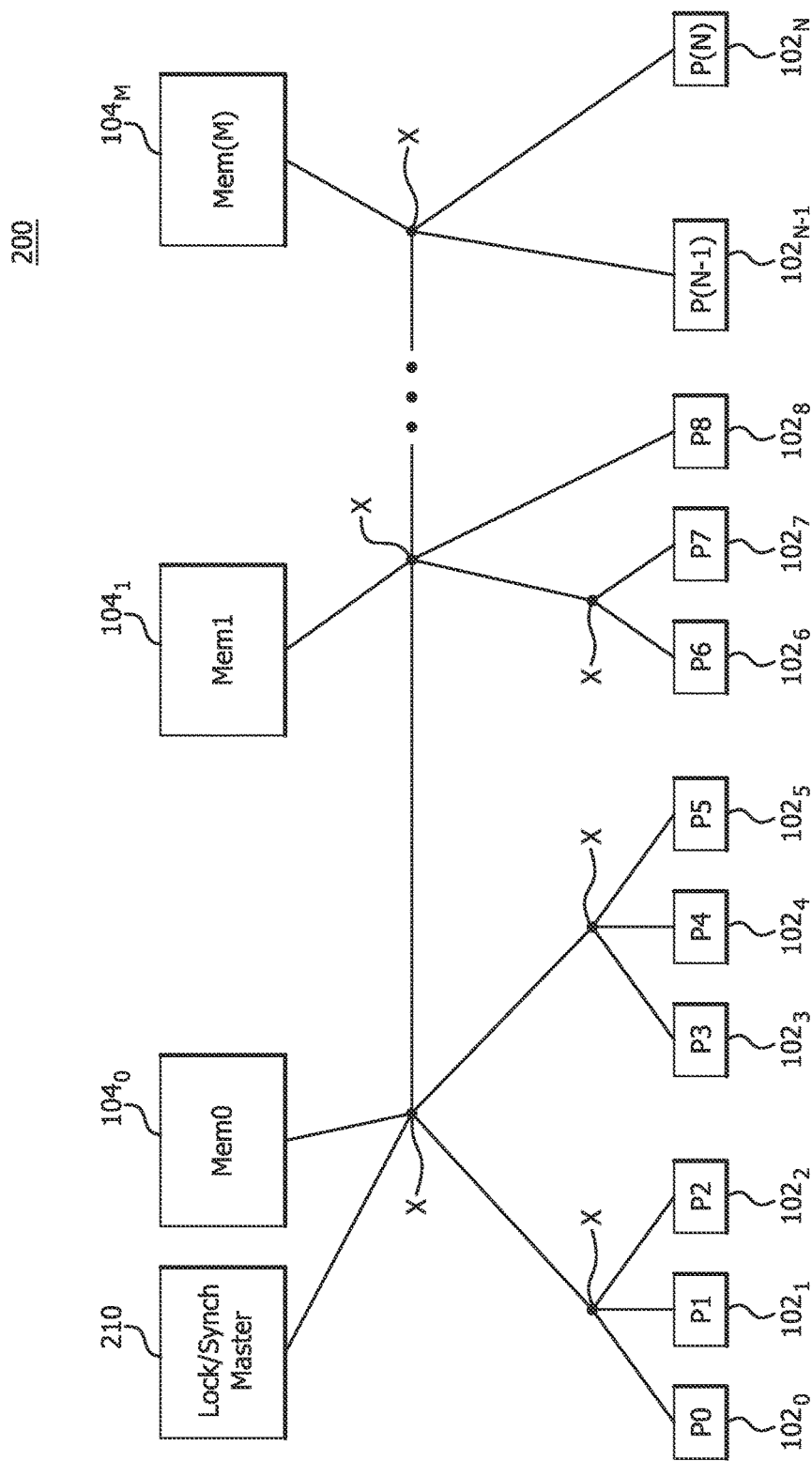
FIG. 2 is a schematic representation of an example system according to an embodiment.

FIG. 2 is a schematic representation of an example system 200 according to an embodiment. The example system 200 includes a plurality of processors $102_1$-$102_N$, (designated P0-P(N)), a plurality of memory devices $104_0$-$104_M$, (designated $Mem_0$-Mem(M)), and a lock/synch master 210. As shown in FIG. 2, the processors 102 are associated with a respective memory 104 via nodes, or switches, "X", with the lock/synch master 210 connected to a node that is directly connected to the memory $104_0$, although the lock/synch master 210 may be connected to any node X. In the example system 200, processors P0-P5 are associated with Mem0, processors P6-P8 are associated with Mem1, and processors P(N−1)-P(N) are associated with Mem(M). It should be noted that although a plurality of memory 104 are shown, any number, and even only one memory may be present in the example system 200. Additionally, although various processors 102 are shown associated with particular memory 104, it should be noted that any processor 102 may have access to any of the memory 102 shown in the example system 200.

Prior to performing either a bus lock operation or a TLB invalidation, processors send a message to the lock/synch master regarding joining/leaving the active pool of processors. This is done to allow the lock/synch master to know which processors are awake and which are asleep at any given time. For example, a processor may send a message to the lock/synch master when the processor wakes to let the lock master know it has joined the active pool of processors and send a message to the lock master when the processor intends to enter a sleep state so that the lock master knows the processor has left the active pool, and will not expect signaling from that processor.

Figure 3:
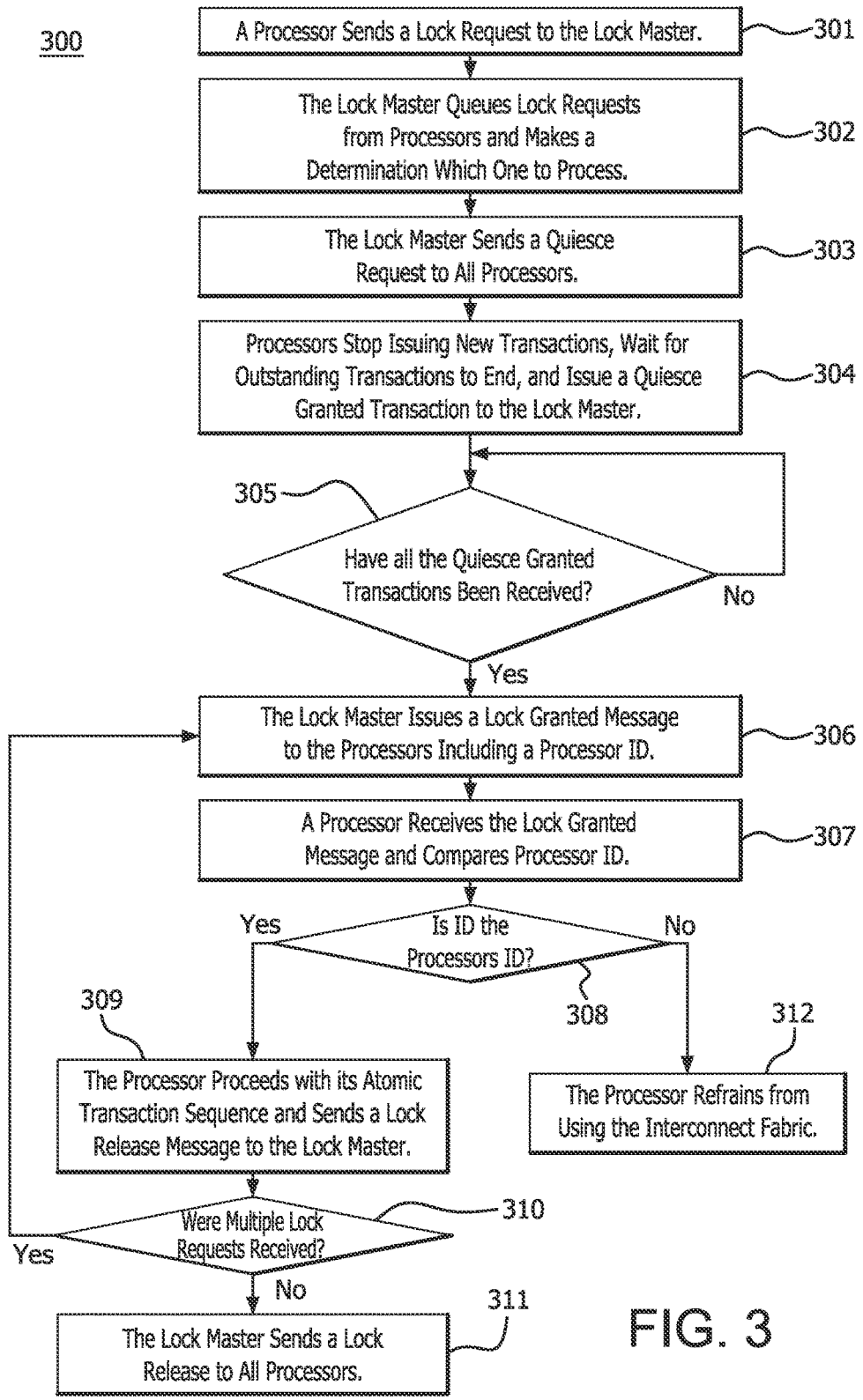
FIG. 3 is a flow diagram of an example method of performing a bus lock according to an embodiment.

FIG. 3 is a flow diagram of an example method 300 of performing a bus lock according to an embodiment. For convenience, the lock/synch master is described as a "lock master" for example method 300.

In step 301, a processor sends a lock request to the lock master when the processor has need to begin an atomic read-modify-write transaction. The lock request travels through the interconnect fabric similar to a noncached write, and includes a value that identifies the requesting processor, (e.g., core). The identifier (ID) may be in the form of a core ID. It should be noted that one or more processors may send a lock request to the lock master substantially simultaneously or in close succession to one another.

Upon receiving the lock requests from the processors, the lock master queues them and makes a determination regarding which one to process first (step 302). Once the lock master has made its determination, it sends a quiesce request to all processors (step 303). This broadcast quiesce request message travels through the interconnect fabric, similar to a coherence probe, and instructs all processors to cease utilizing the interconnect fabric.

In step 304, the processors stop issuing new transactions on the interconnect fabric and wait for any outstanding transaction to complete. Once outstanding transactions are complete, the processors issue a quiesce granted transaction on the interconnect fabric to the lock master and wait.

The lock master counts received quiesce granted transactions from the processors and when the count matches number of the active processors, (i.e., all quiesce granted transactions have been received) in step 305, issues by broadcast a lock granted message (step 306). The lock granted message includes the ID of the processor whose lock is being granted.

In step 307, each processor receives the lock granted message from the lock master and compares the grant ID to its own ID. If the grant ID is the processor's ID (step 308), then the processor proceeds with its atomic transaction sequence, (e.g., a read-modify-write), and issues a lock release message to the lock master when complete (step 309). If the grant ID does not match the processors ID in step 308, then the processor refrains from using the interconnect fabric (step 312).

If the lock master has received multiple lock requests (step 310), then the method returns to step 306 where the lock master issues a new lock granted message to the processor that includes the next processors ID grant. Otherwise, the lock master sends a lock release via broadcast message to all the processors (step 311), and the each processor resumes using the interconnect fabric upon receiving the lock release from the lock master.

Figure 4:
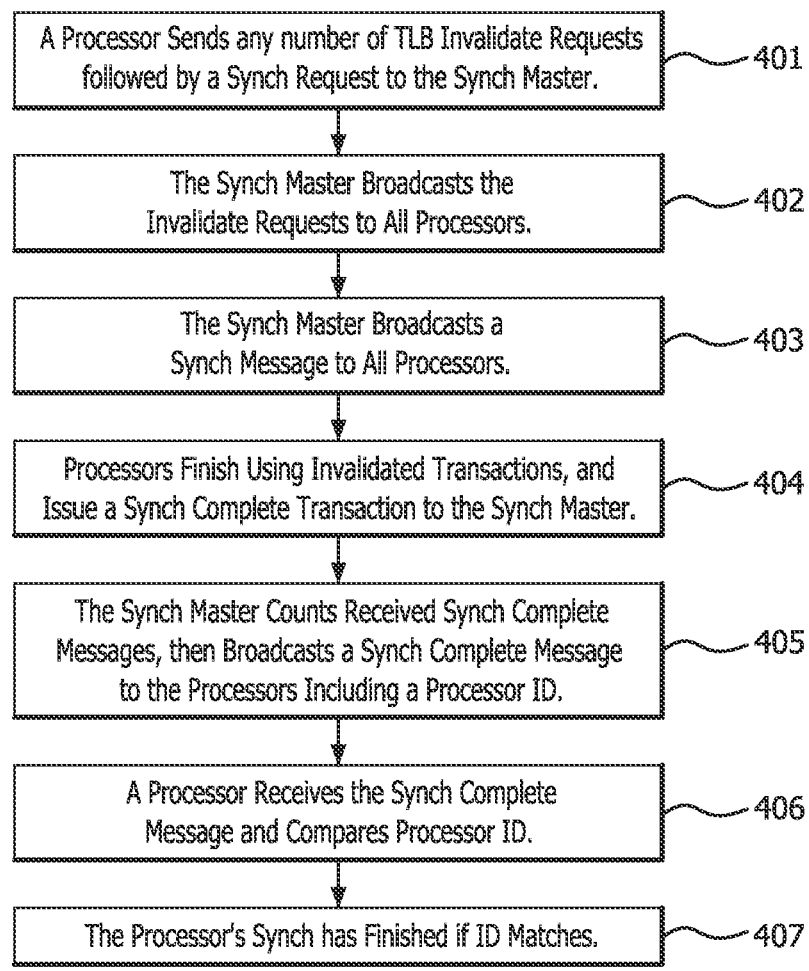
FIG. 4 is a flow diagram of an example method of performing a translation lookaside buffer (TLB) invalidation according to an embodiment.

FIG. 4 is a flow diagram of an example method 400 of performing a translation lookaside buffer (TLB) invalidation according to an embodiment. For purposes of convenience, the lock/synch master is referred to as the synch master in the example method 400.

When a processor needs to change a translation, the processor sends a series of TLB invalidate requests to the synch master, which include the translations that are being deleted (step 401). Then the processor sends a single synch request to the lock master that includes its unique processor ID. To execute the invalidate sequence as quickly as possible, the invalidate requests may be pipelined, whereby the synch request enforces serialization. That is, since serialization requires that a processor changing a translation cannot enable the new translation until it knows that no other processor is still using the old translation, by pipelining invalidate requests, (e.g., issuing a "batch" of any number of TLB invalidate operations followed by a single synchronization operation), the invalidate sequence may be accelerated.

The synch master broadcasts the invalidate request to all processors (step 402), and broadcasts a synch message to every processor (step 403). Upon receipt of the invalidate request and synch message, each processor ensures that it has completed using any previously invalidated transactions, and issues a synch complete message to the synch master (step 404).

The synch master counts the received synch complete messages from the processors and when the count matches number of the active processors, issues by broadcast a synch complete message to the processors (step 405). The synch complete message includes the processor ID whose sync request is completing. If the synch master has multiple synch requests queued, (e.g., it received more than one synch request from more than one processor), but has not received any intervening invalidate requests, the synch master may issue multiple synch complete messages in step 405, instead of individual synch complete messages. This may accelerate the handling of overlapping invalidate/sync sequences by multiple processors. When each processor receives the synch complete message from the synch master, if that processor has not requested a synch then it ignores the synch complete message and continues its normal execution. If that processor has requested a synch, then it compares the ID in the message to its own ID (step 406). If the ID matches in step 406, then the processor knows its own synch has finished (step 407). If the ID does not match, then the processor continues waiting for the synch master to perform the synch that the processor requested. Alternatively, the synch complete message sent by the synch master may be sent only to the processor whose ID is included in the message, or to a subset of the total processors.

It should be understood that many variations are possible based on the disclosure herein. Although features and elements are described above in particular combinations, each feature or element may be used alone without the other features and elements or in various combinations with or without other features and elements.

For example, the interconnect fabric may include any of a variety of technologies. It may include wires between components on an integrated circuit die, wiring on an interposer or package substrate between integrated circuit dies sharing a package, or wiring on a printed circuit board between packages.

Additionally, although the lock master and the synch master are described above as being resident in a single entity, (i.e., 210), it should be noted that they may each reside in separate entities.

Furthermore, the methods 300 and 400 above may be implemented in the components of the example system 200, where the lock master or synch master includes the lock/synch master 210 and the processors include processor P0-P(N). The read-modify-write operations described above may include the processors in FIG. 2 performing a read-modify-write operation to their respective memory, (i.e., Mem0-Mem(M)).

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising:
    receiving, by a lock master, a plurality of lock requests from a plurality of processors in a system, the lock requests including an identifier (ID) identifying the processor associated with each lock request;
    processing, by the lock master, a first lock request from a first processor before processing the lock requests from other processors;
    sending, by the lock master, a quiesce request to all processors in the system;
    upon receipt of the quiesce request from the lock master, ceasing issuing, by all processors, a new transaction and issuing a quiesce granted transaction;

upon receipt of the quiesce granted transactions from all processors, issuing, by the lock master, a lock granted message, wherein the lock granted message issued by the lock master includes the ID of the first processor;

performing, by the first processor, an atomic transaction sequence and sending a first lock release message to the lock master upon completion of the atomic transaction sequence; and sending, by the lock master, a second lock release message to all processors upon receiving the first lock release message from the first processor.

2. The method of claim 1, further comprising the first processor comparing the identifier included in the lock granted message to the identifier of the first processor.

3. The method of claim 1 further comprising the lock master queuing multiple lock requests received from processors other than the first processor.

4. The method of claim 1, further comprising at least one processor sending a message to the lock master to join or leave an active set of processors.

5. The method of claim 4 wherein the at least one processor sends a message to join the active set of processors upon attaining an awake state.

6. The method of claim 4 wherein the at least one processor sends a message to leave the active set of processors upon entering a sleep state.

7. The method of claim 4, further comprising the lock master counting the number of quiesce granted transactions received from the processors, and sending the lock granted message upon determining that quiesce granted transactions are received from all active processors.

8. A system, comprising:
a plurality of processors; and
a lock master; and
wherein the lock master is configured to receive a plurality of lock requests from the plurality of processors in the system, the lock requests including an identifier (ID) identifying the processor associated with each lock request, process a first lock request from a first processor before processing the lock requests from other processors, send a quiesce request to all processors in the system, upon receipt of a quiesce granted transaction from all processors, issue a lock granted message, wherein the lock granted message issued by the lock master includes the ID of the first processor, and send a second lock release message to all processors upon receiving a first lock release message from the first processor.

9. The system of claim 8 wherein upon receipt of the quiesce request from the lock master, all processors cease a new transaction and issue the quiesce granted transaction.

10. The system of claim 8 wherein upon receipt of the lock granted message, the first processor is configured to perform an atomic transaction sequence and send the first lock release message to the lock master upon completion of the atomic transaction sequence.

11. The system of claim 8 wherein the first processor is configured to compare the identifier included in the lock granted message to the identifier of the first processor.

12. The system of claim 8 wherein the lock master is configured to queue multiple lock requests received from processors other than the first processor.

13. The system of claim 8 wherein at least one processor is configured to send a message to the lock master to join or leave an active set of processors.

14. The system of claim 13 wherein the at least one processor sends a message to join the active set of processors upon attaining an awake state.

15. The system of claim 13 wherein the at least one processor sends a message to leave the active set of processors upon entering a sleep state.

16. The system of claim 13 wherein the lock master is configured to count the number of quiesce granted transactions received from the processors, and send the lock granted message upon determining that quiesce granted transactions are received from all active processors.

17. An apparatus comprising:
circuitry configured to receive a plurality of lock requests from a plurality of processors in a system, the lock requests including an identifier (ID) identifying the processor associated with each lock request, process a first lock request from a first processor before processing the lock requests from other processors, send a quiesce request to all processors in the system, upon receipt of quiesce granted transactions from all processors, issue a lock granted message, wherein the lock granted message includes the ID of the first processor, and send a second lock release message to all processors upon receiving a first lock release message from the first processor.

18. The apparatus of claim 17, further comprising circuitry configured to count the number of quiesce granted transactions received from the processors, and send the lock granted message upon determining that quiesce granted transactions are received from all active processors.

* * * * *